(12) United States Patent
Metlitzky et al.

(10) Patent No.: US 7,135,788 B2
(45) Date of Patent: *Nov. 14, 2006

(54) SELF CONTAINED CONTROL UNIT INCORPORATING AUTHORISATION

(75) Inventors: Ivor Metlitzky, Sorrento, WA (US); Richard Thomas Frizell, Kingsley, WA (US)

(73) Assignee: Dynamco Pty Ltd., East Perth (AU)

( * ) Notice: Subject to any disclaimer, the term of this patent is extended or adjusted under 35 U.S.C. 154(b) by 0 days.

This patent is subject to a terminal disclaimer.

(21) Appl. No.: 10/883,858

(22) Filed: Jul. 2, 2004

(65) Prior Publication Data

US 2004/0222700 A1    Nov. 11, 2004

Related U.S. Application Data

(63) Continuation of application No. 10/275,212, filed on Jan. 23, 2003.

(51) Int. Cl.
*B60R 25/00* (2006.01)
*G06F 7/04* (2006.01)
*B60R 25/04* (2006.01)
*G08C 19/00* (2006.01)

(52) U.S. Cl. ............... 307/10.5; 340/5.6; 340/426.11
(58) Field of Classification Search .......... 340/426.11, 340/5.6; 307/10.5
See application file for complete search history.

(56) References Cited

U.S. PATENT DOCUMENTS

| | | | |
|---|---|---|---|
| 5,270,577 A | 12/1993 | Yamaguchi et al. ......... 307/26 |
| 5,479,156 A | 12/1995 | Jones ..................... 340/5.64 |
| 5,517,187 A | 5/1996 | Bruwer et al. ........... 340/825.3 |
| 5,539,388 A | 7/1996 | Modgil .................. 340/825.17 |
| 5,675,490 A | 10/1997 | Bachhuber ........... 364/424.037 |
| 5,677,663 A | 10/1997 | Sansome ................ 340/426 |
| 6,206,130 B1 | 3/2001 | Hetler .................... 180/287 |
| 6,337,620 B1 | 1/2002 | Chen .................. 340/310.01 |
| 6,418,533 B1* | 7/2002 | Angelo et al. ............. 713/202 |
| 6,552,648 B1 | 4/2003 | Rick et al. ................ 340/5.1 |
| 6,583,712 B1 | 6/2003 | Reed et al. .............. 340/5.21 |
| 6,603,388 B1 | 8/2003 | Perraud et al. ........... 340/5.61 |
| 6,664,888 B1 | 12/2003 | Bishop ............... 340/426.11 |
| 6,683,527 B1 | 1/2004 | Greenwood ............. 340/5.61 |

FOREIGN PATENT DOCUMENTS

| AU | 49404/85 | 5/1987 |
|---|---|---|
| EP | 1084 917 A1 | 3/2001 |
| WO | WO 96/41428 | 12/1996 |
| WO | WO 02/18186 A1 | 3/2002 |

* cited by examiner

*Primary Examiner*—Brian Sircus
*Assistant Examiner*—Hal I. Kaplan
(74) *Attorney, Agent, or Firm*—Fredrikson & Byron, P.A.

(57) ABSTRACT

A plug-in replacement relay for automotive use incorporating a security system (43) to control the actuation of the relay is disclosed. The plug-in replacement relay derives its power supply from bridge rectifier(s) (33, 37) having their inputs connected across the coil socket connector (pins 85, 86) and/or the switching contacts (11) (pins 30, 87), allowing polarity free connection. An inhibitor circuit (31) ensures that the contacts (11) are actuated only when intended.

38 Claims, 6 Drawing Sheets

SELF CONTAINED CONTROL UNIT INCORPORATING AUTHORISATION

CROSS REFERENCE TO RELATED APPLICATIONS

The present application is a continuation of patent application having U.S. Ser. No. 10/275,212, filed 23 Jan. 2003, which claims priority to International Application No. PCT/AU01/01075 (published as International Publication No. WO 02/18186), filed 28 Aug. 2001 and designating the United States, which in turn claims priority to Australian Provisional Application No. PQ 9739, filed 28 Aug. 2000, the entire disclosures of which are incorporated herein by reference.

BACKGROUND OF INVENTION

This invention relates to a control unit for supplying power to a circuit, and in particular to such a control circuit for an automotive application.

In a modern automobile, relays are often used to obviate the need for high current capacity wiring being routed to control switches in the vehicle cabin, and also to obviate the need for such control switches to be rated to carry such high currents. An application of such is the use of a relay having its coil connected to the high beam circuit, and its high current contacts used to make a circuit to driving lights. Without the use of the relay, the extra current load of the driving lights, in addition to the high beam current load of the existing driving lights, would result in failure of the high/low beam switch and/or the headlight switch with normal vehicle wiring. While this could be obviated in vehicle manufacture by including heavier wiring and heavier rated switches, so that in the event a vehicle owner decided to install driving lights, the vehicle circuitry would be of a sufficient rating, this is generally not done, in order to save manufacturing costs.

For similar cost saving measures, such relays, which are usually electromechanical devices, although there is no reason why they could not be solid state (ie transistorised), have been utilised in other parts of the vehicle circuitry. This includes for switching the vehicle ignition circuitry and the vehicle fuel pump and fuel injection circuitry. In this manner, the more expensive high current capacity wiring can be run on as short a route as possible, in circuit with the vehicle fuse box, the relay contacts, and the ignition coil (or ignition coils) primary (which can carry at least 4 amps), and similarly in circuit with any fuel pumps and fuel injection pressurisation pumps. The relay coils, which require perhaps 5% or less current to actuate than the load drawn by the circuits that the contacts actuate, can utilise much lighter wiring connected to the vehicle ignition switch, and a much lower current rating on the contacts in the vehicle ignition switch than would be the case if the circuits were connected to the ignition switch directly.

A very obvious application of such an arrangement is in the solenoid assembly which is used to actuate the vehicle starter motor. However in the case of the starter motor, the solenoid is only operated when the vehicle ignition is turned to the "start" position.

In the case of relays which connect to the ignition and any fuel pump circuitry, these must be actuated when the ignition is set to both the "run" and "start" positions.

Modern vehicle immobilisers, which can be stand-alone or incorporated into alarm systems, are usually wired into the circuitry in a vehicle to interrupt power to the vehicle ignition or fuel pump(s), unless over-ridden by a person who has the key to the alarm. In the past, keys were literally just that, although in more modern alarms electronic keys have been proposed, from simple resistive networks, and numeric keypads, to complex encryption techniques involving binary code strings and code hopping arrangements. In all of these arrangements, the immobiliser must be wired into the vehicle circuitry. This involves modifying existing vehicle circuitry in order to fit the immobiliser, which is time consuming and requires some knowledge of the vehicle circuitry on the part of the installer, or investigation to determine the nature of the vehicle circuitry when the installer is not familiar with it.

It is an object of this invention to provide an immobiliser system which overcomes some of the above problems, or at least provides an alternative to known immobiliser systems.

Throughout the specification, unless the context requires otherwise, the word "comprise" or variations such as "comprises" or "comprising", will be understood to imply the inclusion of a stated integer or group of integers but not the exclusion of any other integer or group of integers.

SUMMARY OF INVENTION

In accordance with the invention there is provided a self contained relay incorporating an actuation authorisation circuit, the self contained relay having a switch for use in switching a circuit, and a controller to actuate the switch, the self contained relay having first input terminals for receiving a control current for the controller, the actuation authorisation circuit having a second input for receiving a code, a memory containing a stored code allocated to the relay, a comparator for comparing the code with the stored code, where the controller actuates the switch in response to the first input receiving the control current, when the comparator determines the code matches the stored code; wherein active circuitry in the relay derives its power supply via at least one bridge rectifier connected to rectify power derived from one or more of the first input, the switch, and an available chassis ground. In this manner the self contained relay is polarity independent, and will work as a plug-in replacement, regardless of the polarity of wiring in the original equipment.

By way of explanation the first input of the self contained relay can be equated to the control coil of a standard relay (at least when the comparator determines a code match), and the switch can be equated to the contacts of a standard relay. In the relay of the invention, the actuation authorisation circuit is interposed between the first input and the controller, allowing the controller to actuate the switch when both a control current is present at the first input and when the codes match.

Typically the switch will comprise switch contacts, used to switch electric current. In one preferred application the switch will switch power to the primary circuit of the ignition coil for a Kettering ignition internal combustion engine. In an alternate application the switch will switch power to a fuel pump in either or both of a fuel system for a vehicle or a fuel injection system for an internal combustion engine. It will be understood that the switch could be solid state, such as a transistor, a silicon controlled rectifier, or a triac.

Typically the controller could comprise the coil of an electromechanical relay having the switch and the base or gate of a transistor, SCR (silicon controlled rectifier), or triac, along with associated driver circuitry as required.

Preferably the active circuitry in the self contained relay derives its power supply from the first input.

Alternatively, the active circuitry in the self contained relay may derive its power supply from the switch.

As a further alternative, the active circuitry in the self contained relay may derive its power supply from both the first input and the switch.

In accordance with a preferred feature of any of the alternatives for deriving the power supply, where part of the power supply is referenced to a chassis ground, for convenience the self contained relay may also be connected to the chassis ground for the purposes of deriving the power supply.

Preferably the code is a serial binary code, and the second input receives the code from a radio receiver located in the self contained relay. In this arrangement, the code can be transmitted from a hand held remote control transmitter, or a removable transmitter that is powered from a connector providing power for this purpose. In a motor vehicle application, the connector may be a socket fitted to the vehicle dashboard, or the existing or a fitted cigar/cigarette lighter socket.

Alternatively, the code is a serial binary code, and the second input receives the code from an amplifier circuit which is connected to the first input, the code being impressed onto the power supply from a removable transmitter that is powered from a connector providing power for this purpose. In a motor vehicle application, the connector may be a socket fitted to the vehicle dashboard, or the existing or a fitted cigar/cigarette lighter socket.

Preferably the self contained relay incorporates an inhibitor circuit which prevents the switch from being actuated unless there is a voltage differential across the first input.

Preferably the inhibitor circuit incorporates an optoisolator having its input connected to the first input.

BRIEF DESCRIPTION OF DRAWINGS

Two particular preferred embodiments of the invention will now be described with reference to the drawings in which.

DETAILED DESCRIPTION

Both embodiments are plug in replacement relays for automotive use, which incorporate an actuation authorisation circuit, which allows the relay to function as an immobiliser, without requiring modification of the vehicle wiring, which is always required with immobilisers of known type, with the exception of those which are fitted as factory standard. Such relays can be fitted to actuate the starter motor solenoid, actuate wiring to the ignition system, and actuate fuel pumps of the general type or fuel pumps utilised in fuel injection systems. Without the actuation authorisation circuit allowing operation of the relay, it is not possible to operate the circuit that the relay is connected to, which renders the vehicle inoperable. Both embodiments are built into relay housings 51 along with switching means in the form of the contacts 11 (K1) and control means in the form of the actuation coil 13, and connected to the relay terminals 15 (CN1), with the actuation authorization circuit interposing between the relay terminals 15 and the actuation coil 13. (See FIGS. 2 and 5).

Figure 1:
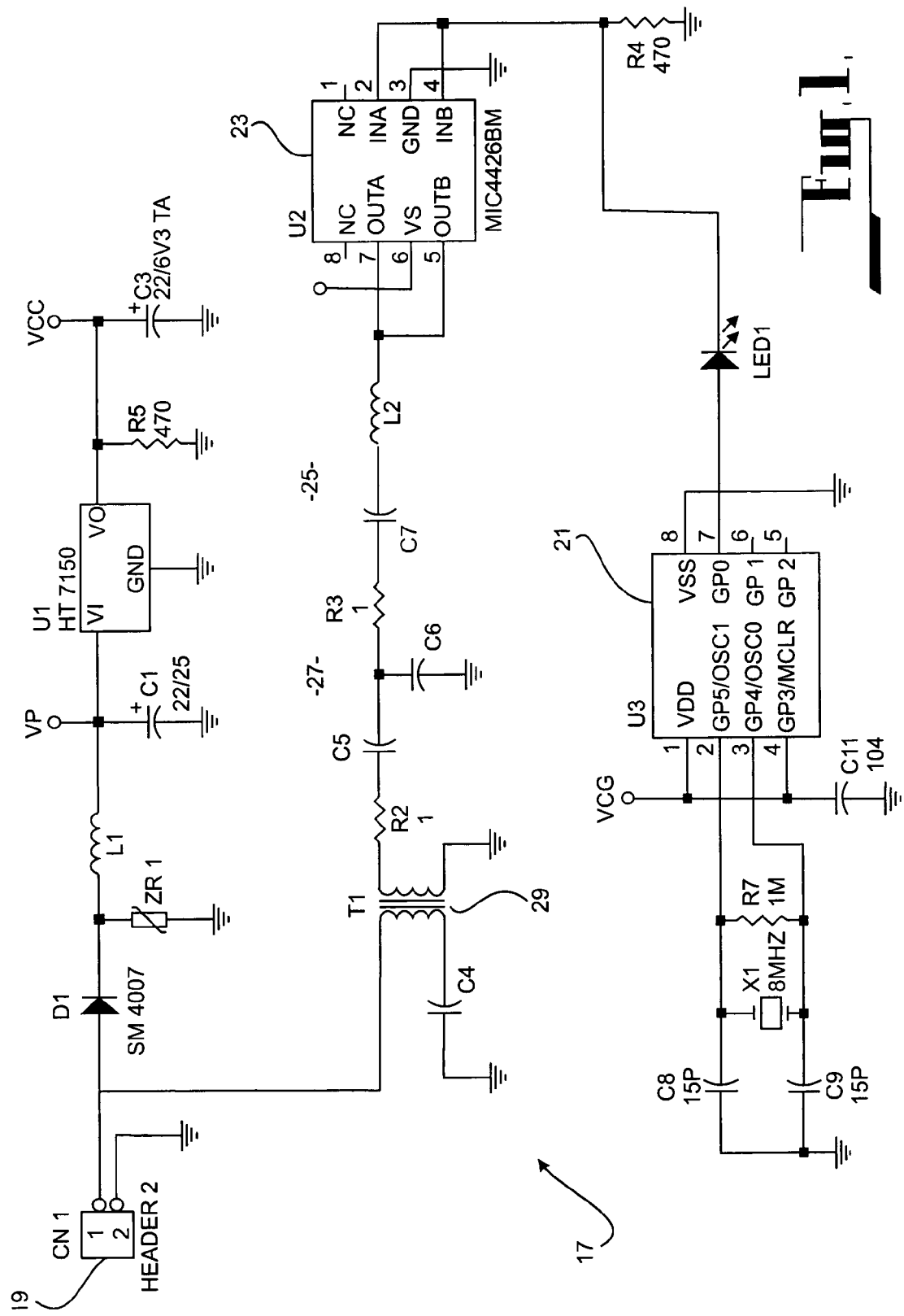
FIG. 1 is a circuit diagram for a code transmitter unit for a vehicle immobiliser according to the first embodiment.

The first embodiment uses a plug-in module 17 shown in FIG. 1, which has contacts 19 and is contained in a housing (not shown) so as to be receivable in a cigarette lighter socket in a motor vehicle dashboard or other interior fitting. The circuitry of the plug-in module 17, when powered, generates a 52.5 kHz frequency shift keying (FSK) coded signal which is superimposed on the wiring of the vehicle.

The plug-in module 17 has a micro-processor 21 (U3) which is programmed to periodically transmit a serially encoded 32 bit data string using frequency shift keying (FSK) code. The data is conveyed to power FET driver 23 (U2) which, via a series resonant circuit 25 (C7, L2, R3) and simple band pass filter 27 (C5, C6, R2), drives transformer 29 (T1) which couples the signal via a very low impedance coupling to the power line, impressing the data on the motor vehicle wiring.

Figure 2:
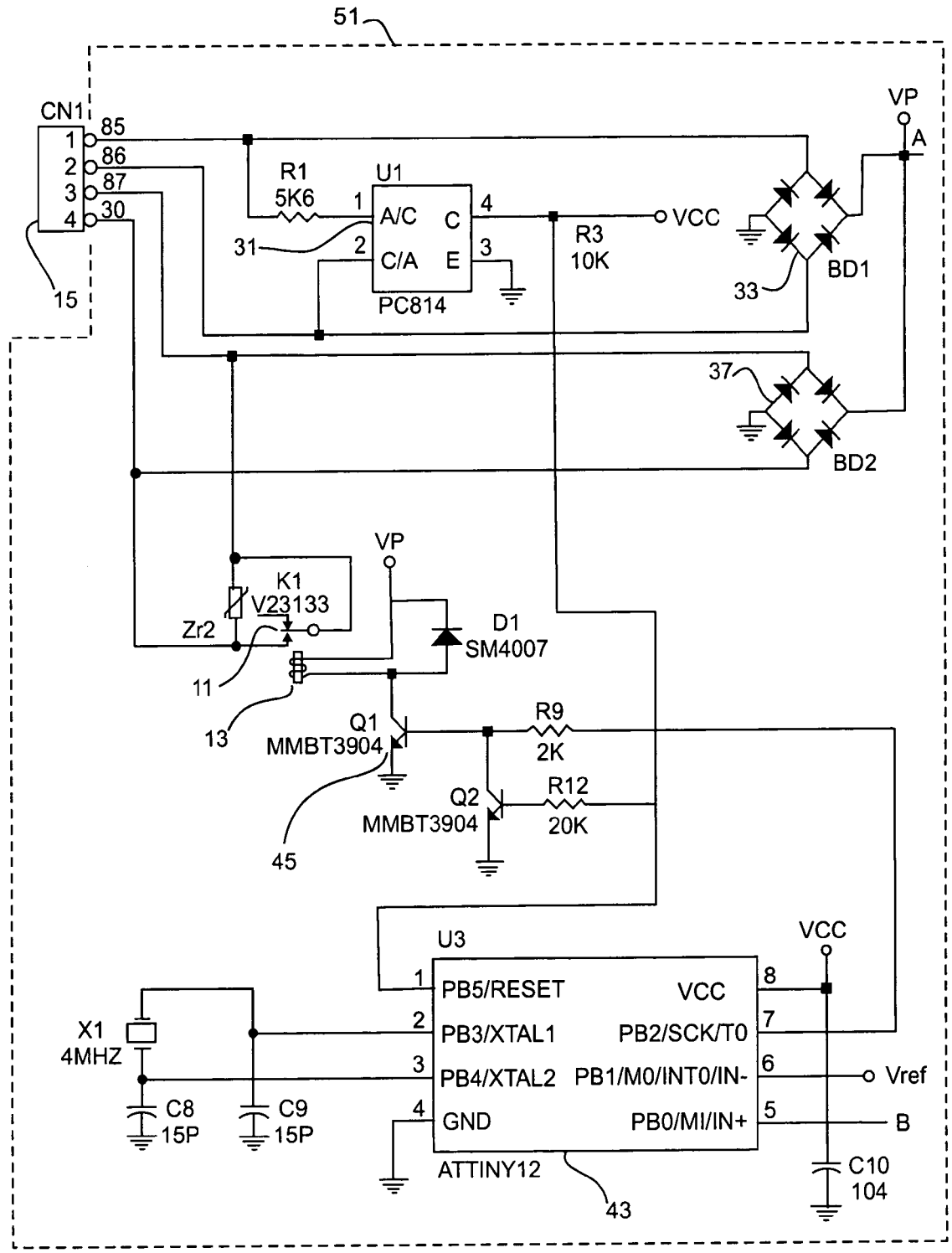
FIGS. 2 to 4 are a circuit diagram for a self contained relay according to the first embodiment.
Figure 3:
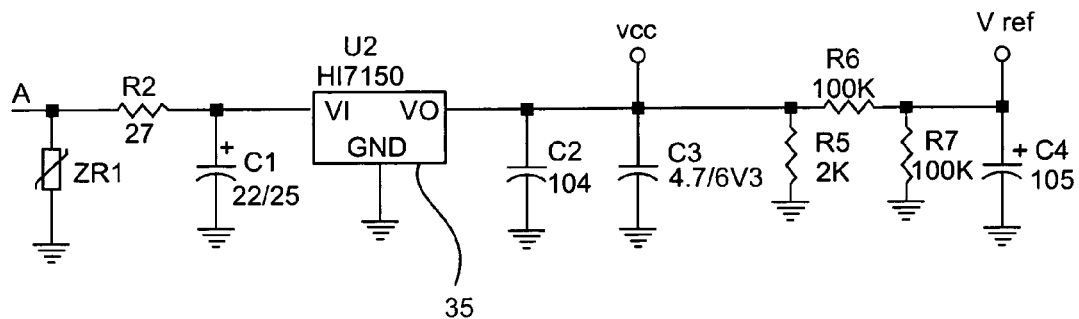
Figure 4:
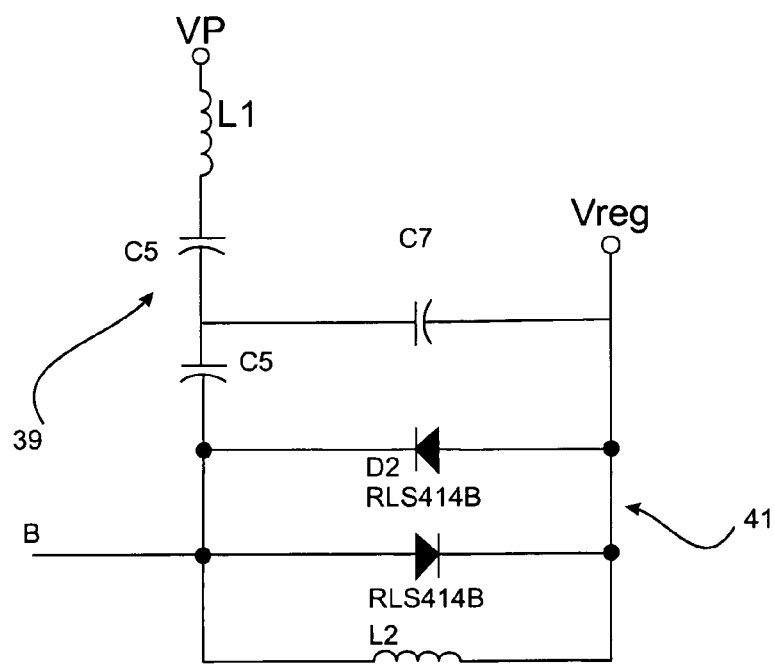

Referring to FIGS. 2 to 4, the relay of the first embodiment is shown. In the relay terminals 15, terminal numbers 30, 85, 86, and 87 are identified. These terminal numbers 30, and 85, 86, 87 are the normal numbers on the standard Bosch or Siemens automotive relay. While other manufacturers may use the same pin compatibility, and/or perhaps the same terminal numbering, it will be understood that there are manufacturers who use neither, and changes will be needed in these instances to ensure that the wiring of the plug-in module matches the socket. In the standard Bosch or Siemens automotive relay, terminal numbers 85 and 86 are always connected to the standard equipment relay coil and the polarity is variable. Terminal number 30 is the common relay contact of the standard equipment relay and terminal number 87 is the normally open contact of the standard equipment relay. The polarity across any of these contacts for the standard equipment relay is again variable. It will be understood that the polarity is variable, depending upon how the relay is wired into the vehicle wiring at the point of manufacture.

In the embodiment shown in FIG. 2, terminals 85 and 86 comprise the first input. When 12 volts appears across terminal numbers 85 and 86, this is the signal to initiate the process to close the internal immobiliser relay. An inhibitor circuit in the form of an opto-isolator circuit 31 (U1) is provided to ensure that process initiation does not commence unless there is a differential across terminal numbers 85 and 86. The reason for the novel use of the opto-isolator 31 and not a simple bridge circuit, is that it is possible to have a positive potential on either terminal numbers 85 and 86 or both. Process initiation should only commence when there is a differential across terminals 85 and 86 and not when they are both high.

Again due to polarity variations likely to be encountered, bridge rectifier 33 (BD1) is used to ensure correct polarity for the 5 volt regulator 35 (U2). Should power for any reason not be available on terminal numbers 85 and 86 prior to the signal to energise (on these pins), a second source of power which has to be polarity corrected, is available on the normally open terminals 87 and 30. Any necessary polarity correction is accomplished by bridge rectifier 37 (BD2).

The following description is made with reference to an application where the standard equipment starter motor relay is replaced by the relay of the first embodiment. As the ignition switch is switched through "accessory" and then "ignition-on" positions, power is supplied to the plug-in module 17, which the driver will have plugged into cigarette lighter socket. If there is no power available at terminal numbers 85 and 86 to energise the unit, there will be power available across terminal numbers 30 and 87. The relay of the embodiment therefore has power derived from terminal numbers 30 and 87 and decodes and verifies the signal supplied by the plug-in unit 17. The FSK signal is picked off the power line from point VP and passed through a band pass filter 39 (L1, C5) with clipping diodes 41 (D2). This small signal is then put into microprocessor 43 (U3) which amplifies the signal and decodes it, comparing it with one of the codes stored in its memory. Should the code be valid a signal is outputted to switch 45 (Q1) which will energise the relay coil 13, when a signal is received from opto-isolator 31. The use of opto isolator 31 ensures that the relay coil 13 is energised only when power is supplied at terminals 85 and 86, and not immediately when the code is determined to be valid. This enables the embodiment to be employed as a replacement starter motor relay.

During the start phase in many motor vehicles, power is lost to the cigarette lighter socket as the ignition switch is turned to the "start" position. The microprocessor 43 includes further memory to temporarily store the received signal, so that the information is available to enable the microprocessor 43 to carry out the operations, resulting in eventual energisation of the relay coil 13 and closure of the relay contacts 11. In an alternative embodiment, this function could be provided by a small rechargeable battery or miniaturised large capacitor (0.5 F or more).

Figure 5:
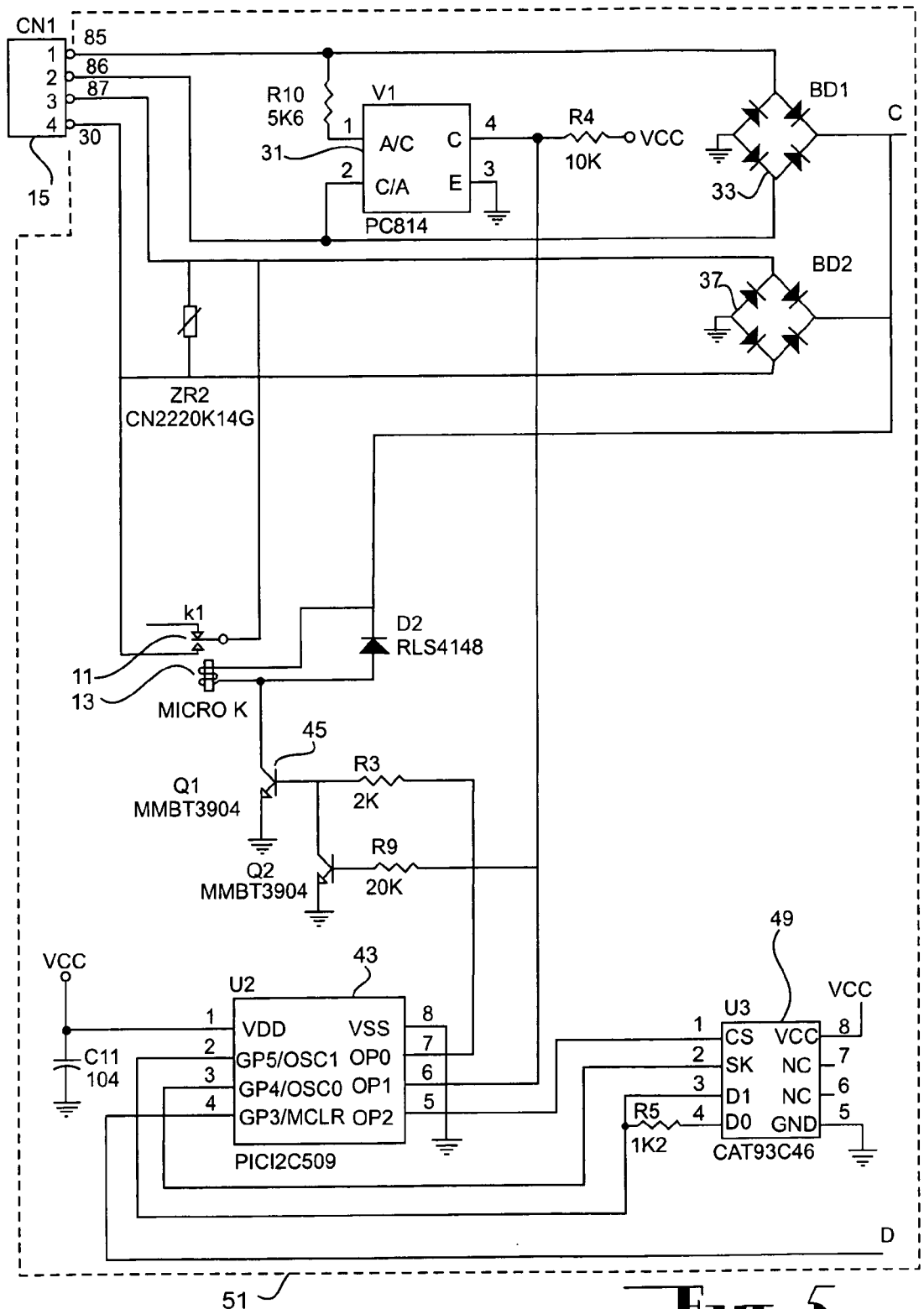
FIGS. 5 to 7 are a circuit diagram for a self contained relay according to the second embodiment.
Figure 6:
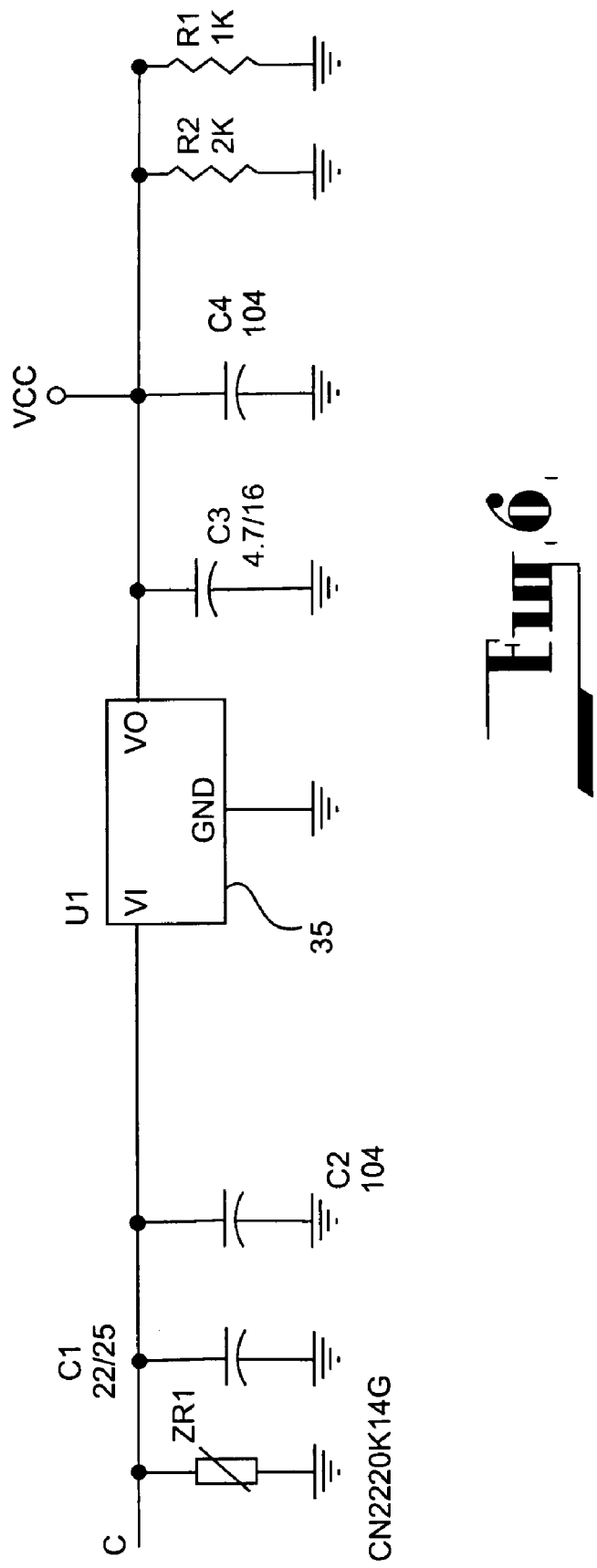
Figure 7:
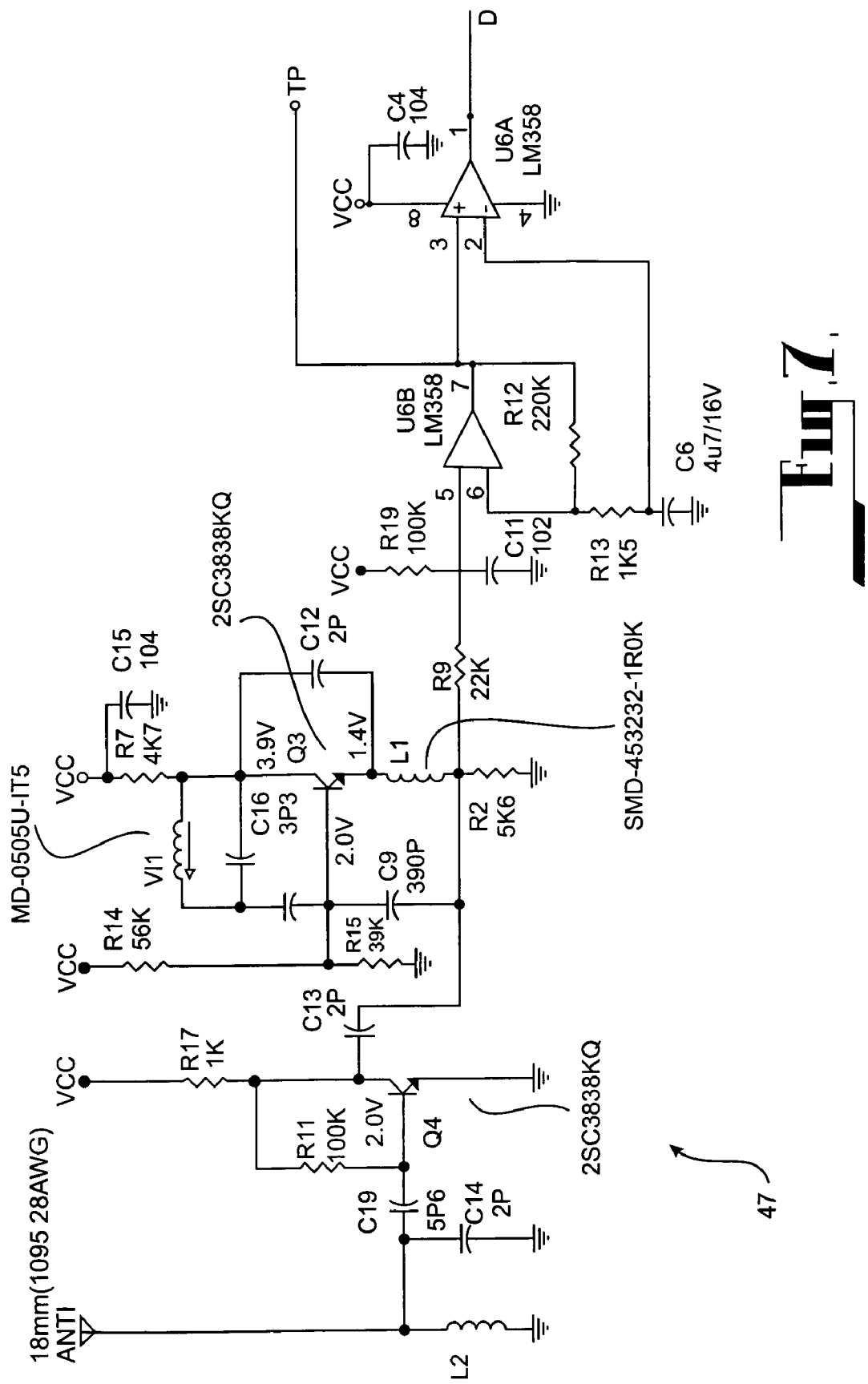

The second embodiment is similar to the first embodiment, except that it uses standard wireless radio transmission to the relay of the embodiment, which is shown in FIGS. 5 to 7. The coding used is random encrypted to avoid code grabbing.

Like numerals describe like parts and functions. Additional componentry comprises radio receiver 47 illustrated generally in FIG. 7, to receive the RF signal from the transmitter. The serial binary signal from the receiver 47 is then compared against the code stored in the EEROM 49 (U3) by microprocessor 43.

The transmitter unit can take the form of a normal hand held remote controlled high frequency random encrypted transmitter unit; however, in another embodiment the transmitter can be built into a unit that plugs into the cigarette lighter socket. As soon as the ignition is turned on the transmitter transmits a signal to the immobiliser.

It should be appreciated that the scope of the invention is not limited to the particular embodiments disclosed herein.

The invention claimed is:

1. A relay housing, comprising:
a relay incorporating an actuation authorisation circuit, said relay having switching means for use in switching a circuit, and control means to actuate said switching means, said relay having a first input for receiving a control current for said control means, said actuation authorisation circuit having a second input for receiving a code, a memory containing a stored code allocated to said relay, a comparator for comparing said code with said stored code, where said control means actuates said switching means in response to both of said first input receiving said control current, and said comparator determining said code matches said stored code; wherein active circuitry in said relay derives its power supply via at least one bridge rectifier connected to rectify power derived from one or more of said first input, said switching means, and an available chassis ground.

2. A relay housing as claimed in claim 1 wherein said active circuitry in said relay derives its power supply from said first input.

3. A relay housing as claimed in claim 2, wherein said relay is also connected to the chassis ground for the purposes of deriving the power supply.

4. A relay housing as claimed in claim 3, wherein said code is a serial binary code, and said second input receives said serial binary code from a radio receiver located in said relay.

5. A relay housing as claimed in claim 2, wherein said code is a serial binary code, and said second input receives said serial binary code from a radio receiver located in said relay.

6. A relay housing as claimed in claim 1 wherein said active circuitry in said relay derives its power supply from said switching means.

7. A relay housing as claimed in claim 6, wherein said relay is also connected to the chassis ground for the purposes of deriving the power supply.

8. A relay housing as claimed in claim 7, wherein said code is a serial binary code, and said second input receives said serial binary code from a radio receiver located in said relay.

9. A relay housing as claimed in claim 6, wherein said code is a serial binary code, and said second input receives said serial binary code from a radio receiver located in said relay.

10. A relay housing as claimed in claim 1 wherein said active circuitry in said relay derives its power supply from both said first input and said switching means.

11. A relay housing as claimed in claim 10, wherein said relay is also connected to the chassis ground for the purposes of deriving the power supply.

12. A relay housing as claimed in claim 11, wherein said code is a serial binary code, and said second input receives said serial binary code from a radio receiver located in said relay.

13. A relay housing as claimed in claim 10, wherein said code is a serial binary code, and said second input receives said serial binary code from a radio receiver located in said relay.

14. A relay housing as claimed in claim 1, wherein said relay incorporates an inhibitor circuit which prevents said switching means being actuated unless there is a voltage differential across said first input.

15. A relay housing as claimed in claim 14, wherein said inhibitor circuit incorporates an optoisolator having its input connected to said first input.

16. A relay housing as claimed in claim 1, wherein said code is a serial binary code, and said second input receives said serial binary code from a radio receiver located in said relay.

17. A relay housing, comprising:
a relay incorporating an actuation authorisation circuit, said relay having switching means for use in switching a circuit, and control means to actuate said switching means, said relay having a first input for receiving a control current for said control means, said actuation authorisation circuit having a second input for receiving a code, a memory containing a stored code allocated to said relay, a comparator for comparing said code with said stored code, where said control means actuates said switching means in response to both of said first input receiving said control current, and said comparator determining said code matches said stored code; wherein active circuitry in said relay derives its power supply via a bridge rectifier connected to rectify power derived from said switching means, and wherein said relay incorporates an inhibitor circuit to ensure said switching means is not actuated unless there is a voltage differential across said first input.

18. A relay housing as claimed in claim 17, wherein said inhibitor circuit incorporates an optoisolator having its input connected to said first input.

19. A relay housing as claimed in claim 17, wherein said code is a serial binary code, and said second input receives said serial binary code from a radio receiver located in said relay.

20. A relay housing comprising: a relay incorporating actuation authorisation means, said relay having switching means for use in switching a circuit, and control means to actuate said switching means, said relay having first input means for receiving a control current for said control means, said actuation authorisation means having second input means for receiving a code, memory means containing a stored code allocated to said relay, comparator means for comparing said code with said stored code, where said control means actuates said switching means in response to said first input means receiving said control current, when said comparator means determines said code matches said stored code; wherein active circuitry in said relay derives its power supply via two bridge rectifiers connected to rectify power derived from said switching means and from said first input means, and wherein said self contained relay incorporates an inhibitor circuit to ensure said switching means is not actuated unless there is a voltage differential across said first input means.

21. A relay housing as claimed in claim 20, wherein said inhibitor circuit incorporates an optoisolator having its input connected to said first input means.

22. A relay housing as claimed in claim 20, wherein said code is a serial binary code, and said second input means receives said serial binary code from a radio receiver located in said relay.

23. A relay housing, comprising:
a relay incorporating an actuation authorisation circuit, said relay having switching means for use in switching a circuit, and control means to actuate said switching means, said relay having a first input for receiving a control current for said control means, said actuation authorisation circuit having a second input for receiving a code, a memory containing a stored code allocated to said relay, a comparator for comparing said code with said stored code, where said control means actuates said switching means in response to both of (1) said first input receiving said control current, and (2) said comparator determining said code matches said stored code; wherein active circuitry in said relay derives its power supply via either or both of a first bridge rectifier connected to rectify power derived from said first input, and a second bridge rectifier connected to rectify power derived from said switching means, and wherein said relay incorporates an inhibitor circuit to ensure said switching means is not actuated unless there is a voltage differential across said first input.

24. A relay housing as claimed in claim 23, wherein said inhibitor circuit incorporates an optoisolator having its input connected to said first input.

25. A relay housing as claimed in claim 23, wherein said code is a serial binary code, and said second input receives said serial binary code from a radio receiver located in said relay.

26. A relay housing for an automobile, the relay housing comprising:
a relay incorporating an immobiliser circuit to control actuation of said relay in response to receipt of a valid encrypted code or serially transmitted binary code; wherein said immobiliser circuit derives its power supply from terminals of said relay connected via at least one bridge rectifier with said terminals to actuate said relay and switching means in said relay.

27. A relay housing as claimed in claim 26, wherein said encrypted code or serially transmitted binary code is received by said immobiliser circuit by a radio receiver located in said relay.

28. A relay housing for an automobile, the relay housing comprising:
a relay incorporating an immobiliser circuit to control actuation of said relay in response to receipt of a valid encrypted code or serially transmitted binary code; wherein said immobiliser circuit derives its power supply from terminals of said relay connected via at least one bridge rectifier with said terminals to actuate said relay and switching means in said relay, and wherein said relay incorporates an inhibitor circuit to ensure said switching means is not actuated unless there is a voltage differential across said terminals to actuate said relay.

29. A relay housing as claimed in claim 28, wherein said inhibitor circuit incorporates an optoisolator having its input connected to said terminals to actuate said relay.

30. A relay housing as claimed in claim 28, wherein said encrypted code or serially transmitted binary code is received by said immobiliser circuit by a radio receiver located in said relay.

31. A relay housing for an automobile, the relay housing comprising:
a relay incorporating an immobiliser circuit to control actuation of said relay in response to receipt of a valid code; wherein said immobiliser circuit derives its power supply from terminals of said relay connected via either or both of a first bridge rectifier connected to rectify power derived from said terminals to actuate said relay, and a second bridge rectifier connected to rectify power derived from said terminals connecting to switching means in said relay.

32. A relay housing as claimed in claim 31, wherein said code is a serial binary code, and said immobiliser circuit receives said serial binary code from a radio receiver located in said relay.

33. A relay housing for an automobile, said relay incorporating an immobiliser circuit to control actuation of said relay in response to receipt of a valid encrypted code or serially transmitted binary code; wherein said immobiliser circuit derives its power supply from terminals of said relay connected via either or both of a first bridge rectifier connected to rectify power derived from said terminals to actuate said relay, and a second bridge rectifier connected to rectify power derived from said terminals connecting to switching means in said relay, and wherein said relay incorporates an inhibitor circuit to ensure said switching means is not actuated when said immobiliser circuit has received a valid encrypted code or serially transmitted binary code unless there is a voltage differential across said terminals to actuate said relay.

34. A relay housing as claimed in claim 33, wherein said inhibitor circuit incorporates an optoisolator having its input connected to said terminals to actuate said relay.

35. A relay housing as claimed in claim 33, wherein said encrypted code or serially transmitted binary code is received by said immobiliser circuit by a radio receiver located in said relay.

36. A relay housing comprising: a relay incorporating an actuation authorisation circuit, said relay having switching means for use in switching a circuit, and control means to actuate said switching means, said relay having a first input for receiving a control current for said control means, said actuation authorisation circuit having a second input for receiving a code, a memory containing a stored code allocated to said relay, a comparator for comparing said code with said stored code, where said control means actuates said switching means in response to both of said first input receiving said control current, and said comparator determining said code matches said stored code; wherein active circuitry in said relay derives its power supply via two bridge rectifiers connected to rectify power derived from said switching means and from said first input, and wherein said relay incorporates an inhibitor circuit to ensure said switching means is not actuated unless there is a voltage differential across said first input.

37. A relay housing as claimed in claim 36, wherein said inhibitor circuit incorporates an optoisolator having its input connected to said first input.

38. A relay housing as claimed in claim 36, wherein said code is a serial binary code, and said second input receives said serial binary code from a radio receiver located in said relay.

* * * * *